United States Patent [19]

Brazelton

[11] Patent Number: 4,522,502
[45] Date of Patent: Jun. 11, 1985

[54] MIXING AND FEEDING APPARATUS

[75] Inventor: Carl L. Brazelton, Austin, Tex.

[73] Assignee: Stran Corporation, Bradley, Ill.

[21] Appl. No.: 539,552

[22] Filed: Oct. 6, 1983

Related U.S. Application Data

[63] Continuation-in-part of Ser. No. 436,023, Oct. 22, 1982, abandoned.

[51] Int. Cl.³ .................... G05D 11/00; B01F 15/02; B01F 7/20
[52] U.S. Cl. .................................. 366/160; 366/168; 422/135
[58] Field of Search ............... 366/150, 160, 161, 162, 366/167, 168, 177, 279; 422/135, 137, 259; 252/359 R, 359 C, 359 D

[56] References Cited

U.S. PATENT DOCUMENTS

| | | | |
|---|---|---|---|
| 2,008,684 | 7/1935 | Craddock | 252/359 C |
| 2,503,228 | 4/1950 | Wanner | 366/168 |
| 2,651,582 | 9/1953 | Courtney | 252/359 C |
| 3,128,995 | 4/1964 | Shaeffer | 422/135 |
| 3,186,803 | 6/1965 | Akaboshi et al. | 422/901 |
| 3,322,507 | 5/1967 | Smith | 422/901 |
| 3,397,646 | 8/1968 | Allsopp | 210/198.1 |
| 3,434,804 | 3/1969 | Winn | 422/135 |
| 3,508,882 | 4/1970 | Farnell | 422/901 |
| 3,559,959 | 2/1971 | Davis et al. | |
| 3,624,019 | 11/1971 | Anderson et al. | 422/901 |
| 3,765,655 | 10/1973 | Latinen | 422/135 |
| 3,770,250 | 11/1973 | Uchida | 366/168 |
| 3,807,701 | 4/1974 | Reid et al. | 422/901 |
| 3,909,207 | 9/1975 | Bir | 422/901 |
| 4,057,223 | 11/1977 | Rosenberger | 366/172 |
| 4,125,574 | 11/1978 | Kastner et al. | 422/135 |
| 4,190,617 | 2/1980 | Hope et al. | 366/171 |
| 4,217,145 | 8/1980 | Gaddis | |
| 4,218,147 | 8/1980 | Rosenberger | 366/162 |
| 4,233,265 | 11/1980 | Gasper | 422/135 |
| 4,365,988 | 12/1982 | Graham et al. | 366/168 |

Primary Examiner—Robert W. Jenkins
Attorney, Agent, or Firm—Emrich & Dithmar

[57] ABSTRACT

The mixing and feeding apparatus comprises a frame on which is mounted a polymer delivering pump and a water delivering mechanism. The frame also supports a mixer which includes a vessel for receiving the polymer and the water. The impeller mechanism includes four fins at right angles rotatably mounted in the vessel for mixing the water and the concentrated polymer into low shear, high torque conditions.

39 Claims, 12 Drawing Figures

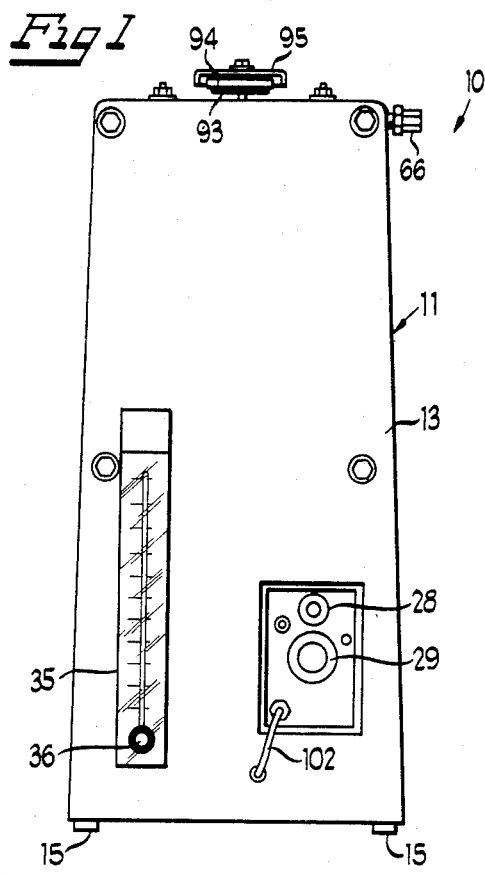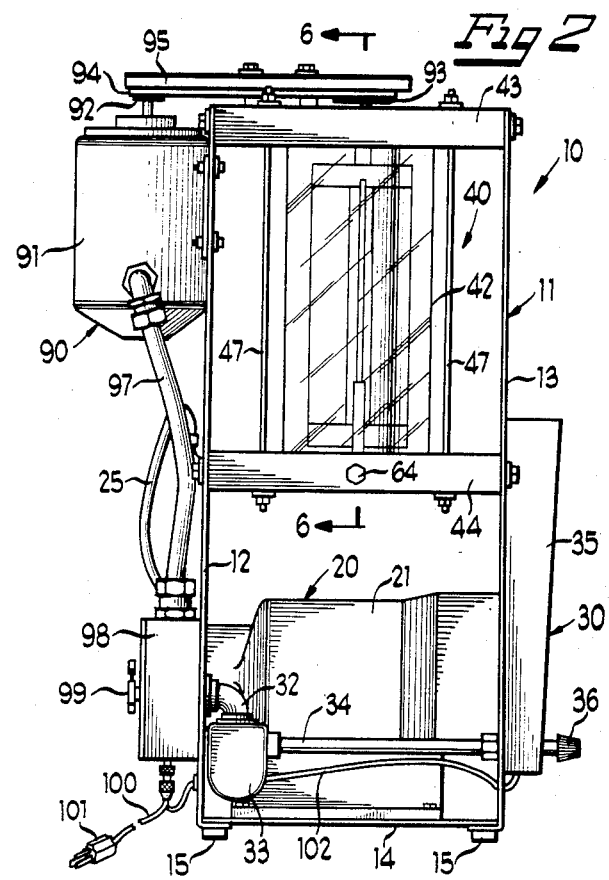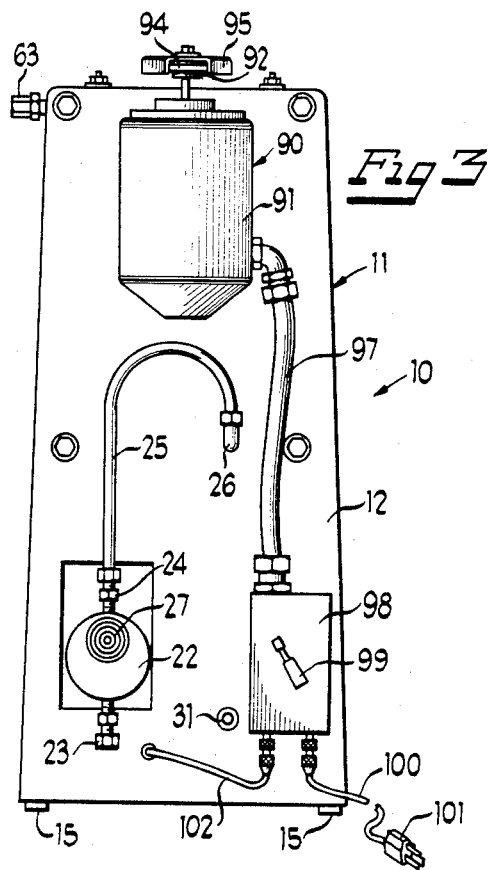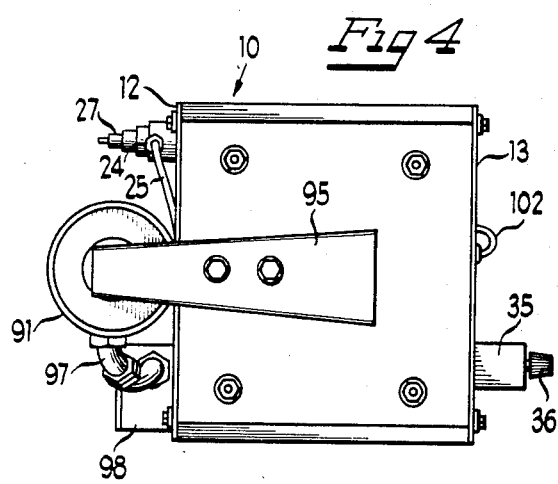

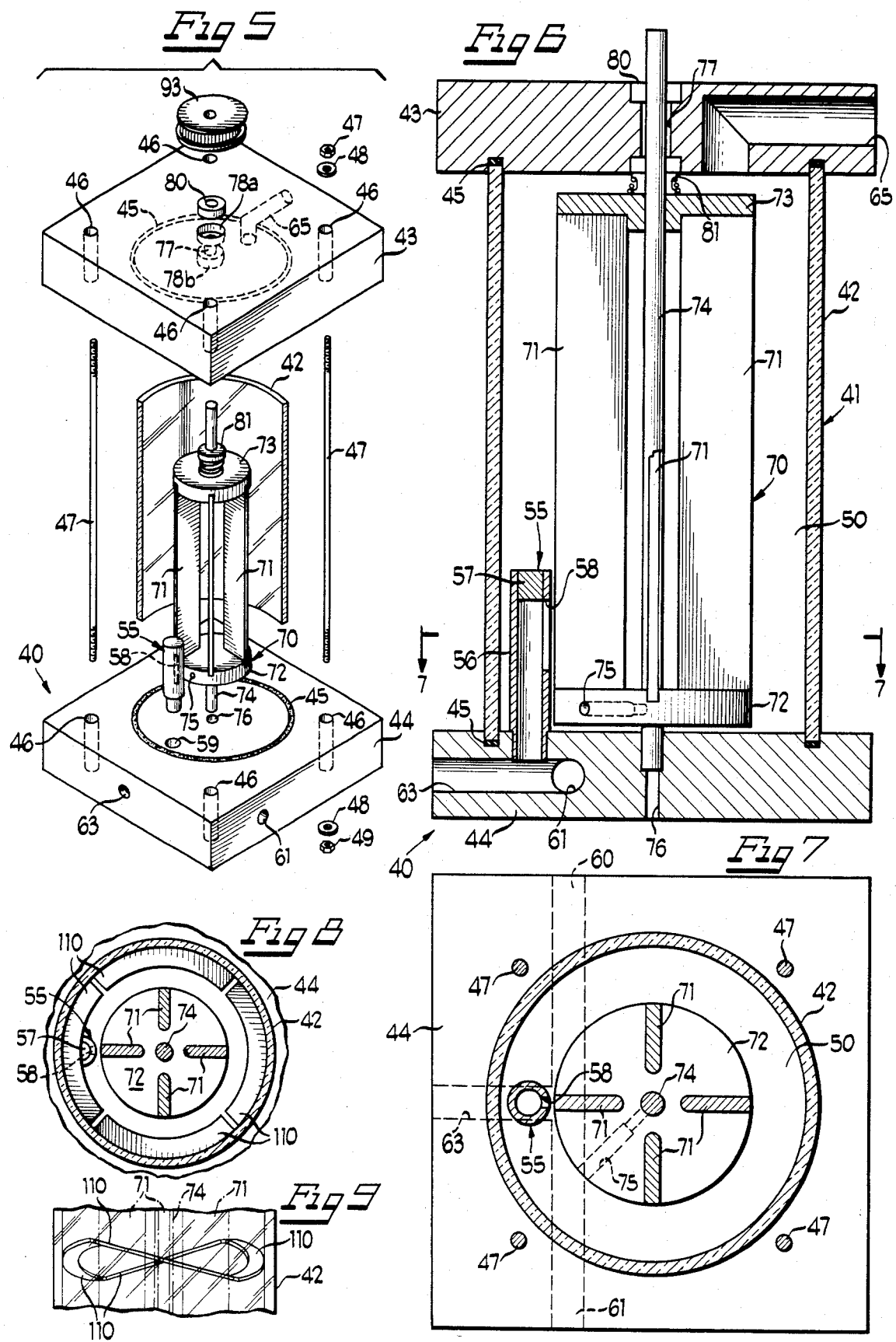

MIXING AND FEEDING APPARATUS

CROSS-REFERENCE TO OTHER APPLICATION

This application is a continuation-in-part of copending application Ser. No. 436,023, filed Oct. 22, 1982, now abandoned.

BACKGROUND OF THE INVENTION

This invention relates generally to apparatus which mixes two liquids, and specifically to such an apparatus which mixes a viscous liquid polymer with water to provide a diluted polymer of particular use in the treatment of water.

Polymers are commonly used in water treatment equipment in order to remove solids suspended in the water. Polymers, or polyelectrolytes as they are sometimes called, carry an electrostatic charge which attracts particles suspended in water. Since virtually all solids carry a negative or positive charge, they are attracted to these polymers. Polymers are extremely large with millions of charge sites that attract suspended particles.

Polymer is available in dry or liquid form. Dry polymers are inactive because the molecules are coiled. Although being less expensive, dry polymers require complex and costly equipment to be converted into the active, liquid state. Liquid polymer may be highly concentrated, containing 15–30% active polymer, in which case the molecules are only partially uncoiled. Concentrated liquid polymer is prepared from dry polymer at chemical processing plants under exacting conditions using expensive equipment. These chemical processing plants are capable of providing the polymer at any selected concentration.

The more diluted the polymer the shorter its useful life. Dry polymer lasts indefinitely, concentrated liquid polymer lasts several months, and dilute polymer of a concentration of a few percent deteriorates in days. It is the last form which is most effective in water treatment because the molecules are fully uncoiled to provide a maximum number of charge sites to attract particles suspended in the water to be treated. But, polymer so diluted will lose much of its effectiveness during shipment and storage. It is, therefore, advantageous to ship concentrated polymer to the site of the water treatment apparatus and there provide mixing equipment to dilute the polymer and produce only as much diluted polymer as needed on a daily basis, for example.

But, in the diluted condition the uncoiled polymers are delicate and the chains are easily broken. Nor is dilution easily accomplished since the polymers do not mix readily with water.

Currently the concentrated polymer arrives at the treatment facility in drums and is transferred by use of gear pumps into mixing tanks containing water. Gear pumps tend to damage the concentrated polymer. In the tanks, mixers are used to mix the water and polymer. Metering pumps feed the diluted polymer to the water that is to be treated. Such systems range in price from $5,000 to $50,000. The mixers tend to create a great deal of shear causing the delicate polymer chains to be broken and clump together. The mixer is small compared to the size of the mixing tank, causing highly localized mixing action so that the product thus produced is not very uniform. Nor is it easy to control precisely the concentration in the tank to match the concentration as specified by the polymer manufacturer to provide optimum water treatment. Also, such equipment makes it difficult to produce the same concentration from batch to batch. Gear pumps do not enable adjusting the rate of flow of the concentrated polymer into the tank unless complicated and expensive variable speed drives are utilized.

Generally, conventional polymer feed systems are expensive to purchase and to operate, require frequent maintenance, and do not provide a satisfactory product.

SUMMARY OF THE INVENTION

It is therefore an important object of the present invention to provide a mixing apparatus which can uniformly mix two liquids at a selected concentration at reduced cost.

Another object is to provide a mixing and feeding apparatus which mixes concentrated polymer with water while subjecting the polymer to a minimum amount of shear.

Another object is to provide mixing and feeding apparatus which produces dilute polymer to a desired concentration consistently and repeatably and is precisely controllable.

Another object is to provide mixing and feeding apparatus which delivers the diluted polymer continuously rather than pulsatingly.

In summary, there is provided a mixing and feeding apparatus for mixing and feeding two liquids, comprising a vessel defining a substantially cylindrical chamber therein, the chamber having a cylindrical axis and a given cross-sectional area through the cylindrical axis, first inlet means for carrying one of the liquids to the chamber, second inlet means for carrying the other liquid to the chamber, outlet means for carrying the mixed liquids away from the vessel, an impeller mechanism mounted in the chamber for rotation about the cylindrical axis thereof, the impeller mechanism including a plurality of fins having a combined surface area at least one-half the cross sectional area of the chamber, the impeller mechanism being located closely adjacent to the nozzle means, and means for rotating the impeller mechanism.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a rear elevational view of a mixing and feeding apparatus incorporating the features of the present invention;

FIG. 2 is a side elevational view of the mixing and feeding apparatus;

FIG. 3 is a front elevational view of the mixing and feeding apparatus;

FIG. 4 is a top plan view of the mixing and feeding apparatus;

FIG. 5 is an exploded view of the mixer portion of the mixing and feeding apparatus;

FIG. 6 is an enlarged view in vertical section taken along the line 6—6 of FIG. 2, of the mixer portion of the mixing and feeding apparatus without the outlet fitting and the drain plug;

FIG. 7 is a view in horizontal section taken along the line 7—7 of FIG. 6;

FIG. 8 is a view like FIG. 7, but on a reduced scale, illustrating backmixing vanes;

FIG. 9 is a fragmentary elevational view on a reduced scale, of the mixer illustrating the backmixing vanes.

DETAILED DESCRIPTION OF THE PREFERRED EMBODIMENT

Figure 10:
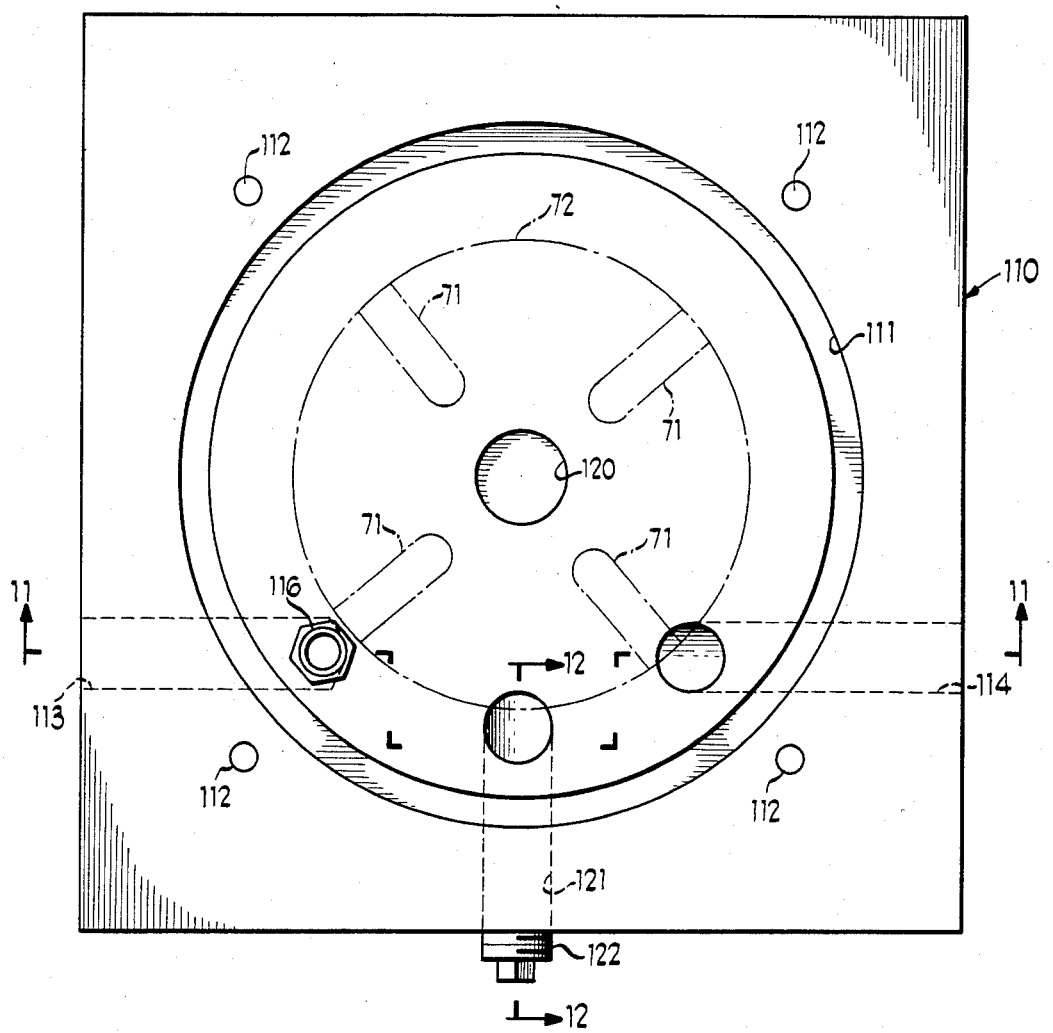
FIG. 10 is a plan view of a bottom wall for use in a second embodiment to the present invention, the fins being shown in phantom.

Turning now to the drawings and more particularly to FIGS. 1-4 thereof, there is depicted a mixing and feeding apparatus incorporating the features of the present invention and generally designated by the numeral 10. The apparatus 10 is for use with a drum of concentrated polymer and a source of water. The apparatus 10 draws polymer from the drum and receives water from the supply, mixes the polymer and the water, and provides a homogeneous diluted polymer of the desired concentration.

The mixing and feeding apparatus 10 comprises a frame 11 which is generally U-shaped in transverse cross section, as viewed in FIG. 2. The frame 11 includes a front panel 12 and a rear panel 13. The bottoms of the panels 12 and 13 are inturned and attached to a generally square base 14. A set of four feet 15 is attached to the inturned flanges of the panels 12 and 13.

The mixing and feeding apparatus 10 comprises a polymer delivery mechanism 20, the basic element of which is a non-gear type pump 21. The pump 21 includes a totally enclosed pump drive with no exposed moving parts and is capable of moving highly viscous materials such as concentrated liquid polymer. The output of the pump is pulsating in order to provide a means of accurately adjusting the delivery rate. The pump 21 has an end or head 22 that is particularly adapted to pumping viscous polymer. An operative embodiment of the mixing and feeding apparatus 10 incorporated a pump made by Liquid Metronics, Incorporated of Acton, Mass. and particularly its model No. A111-86. Such pump is adjustable to enable selection of the rate of flow of the polymer from 0.02 gallon per hour to 1 gallon per hour at a pressure of 80 psi. Such pump has an adjustable stroke length and stroke frequency and operates on 115 volts AC. The head 22 has an inlet fitting 23 for connection by way of tubing to a drum or tank (not shown) containing the undiluted or "neat" polymer. The head 22 also has an outlet fitting 24 which is connected to one end of tubing 25, the other end of which is connected to a fitting 26. A nozzle 27 may be incorporated into the head 22 for priming purposes. The stroke frequency is controlled by a knob 28 and the stroke length is controlled by a knob 29. The frequency is adjustable from 4 to 100 actuations per minute, each stroke moving 0.63 cc. The knob 29 establishes the stroke length at any point between 20% to 100% of its maximum. The stroke length is preferably set above 50%.

The mixing and feeding apparatus 10 further comprises a water delivery mechanism 30 which includes an inlet port 31 for connection to a supply of water. Fitting 32 connects the inlet port 31 to a solenoid valve 33 which is normally closed. As soon as power is supplied to the apparatus 10, the valve 33 is opened and water flows through tubing 34 into a flow meter 35. An operative embodiment incorporated a flow meter 35 made by Dwyer Instruments, Inc. of Michigan City, Ind. It has a knob 36 to control the rate of water flow from 0 to 100 gallons per hour.

The apparatus 10 further comprises a mixer 40 the details of which are best seen in FIGS. 5-7. The mixer 40 in turn comprises a cylindrical vessel 41 defined by a generally cylindrical barrel 42 and square top and bottom walls 43 and 44. The barrel 42 is preferably formed of clear acrylic so that the operator can observe the interior and thus know whether any malfunction is occurring. The bottom of the top wall 43 and the top of the bottom wall 44 have circular grooves therein with a diameter equal to the diameter of the barrel 42 and respectively receiving O-rings 45 therein. The ends of the barrel 42 are located in the grooves in contact with the O-rings 45. The top wall 43 has a set of four holes 46 arranged near the corners, and being vertically aligned with an identical set of four holes 46 in the bottom wall 44. A set of four rods 47 having threaded ends are located respectively in the vertically aligned pairs of holes and are held in place by means of washers 48 and nuts 49, which compress the O-rings 45 so as to define a liquid-tight chamber 50 inside the vessel 41.

Located within the chamber 50 is a nozzle 55 which actually is a short length of pipe 56 having one end closed by a plug 57 and a slit 58 in the side wall. In an operative embodiment, the slit 58 had rounded ends and measured $1\frac{1}{4}$ inch in length. The other end of the pipe 56 is of reduced diameter and fits within a vertically oriented bore 59 in the bottom wall 44. The bore 59 communicates with a polymer inlet bore 60 and a water inlet bore 61, both of which are horizontally oriented. A drain bore 63 in the bottom wall 44 is also horizontally oriented, its axis being perpendicular to the axes of the bores 60 and 61 and communicating therewith and with the bore 59. The outer ends of the bores 60 and 63 are threaded, the bore 63 being closed with a plug 64. The top wall 43 has an outlet bore 65 which is L-shaped, having its longer leg horizontal and the shorter leg vertical and communicating with the chamber 50. The bore 65 has mounted therein an outlet fitting 66 (FIGS. 1 and 3).

The inlet of the flow meter 30 is connected to the tubing 34 and the outlet is connected to the inlet bore 61. Thus, water flows through the flow meter 35, through the bore 61, to the bore 59, and then vertically upwardly through the nozzle 55 exiting into the chamber 50 as a vertically oriented sheet. Concentrated polymer is moved by the pump through the bore 60 and into the bore 59 where it moves vertically through the nozzle 55 and also exits into the chamber 50 in the form of a vertically oriented sheet.

The mixer 40 also comprises an impeller mechanism 70 to mix liquids introduced into the chamber 50. The impeller mechanism 70 includes four slat-like fins 71, each being at right angles with respect to adjacent fins. The impeller mechanism 70 includes a bottom cap 72 having a set of four radially extending grooves at right angles with respect to each other. The top cap 73 also has a set of four radially extending grooves respectively aligned with the grooves in the cap 72. The four pairs of vertically aligned grooves respectively receive the four fins 71. Extending through the centers of the caps 72 and 73 is a shaft 74. Each cap 72 and 73 has a radially extending hole 75 therein in which is located a set screw for attaching the end caps to the shaft 74. The bottom cap 72 has a vertically extending hole 76 therein which receives the lower end of the shaft 74 and the top cap 73 has a hole 77 for receiving the top end of the shaft 74. Enlarged portions 78a and 78b on the ends of the hole 77 in the top cap 73 respectively receive bearing 80 and mechanical seal 81, in which the upper end of the shaft 74 is journaled. The impeller mechanism 70 is thus rotatably mounted in the vessel 41 about a vertical axis.

The mixing and feeding apparatus 10 further comprises a drive mechanism 90 for rotating the impeller mechanism 70. Referring back to FIGS. 1-4, the drive mechanism 90 includes a motor 91 attached to the front panel 12 adjacent the upper end thereof. In an operative embodiment, the motor 91 developed 1/6 horsepower at 1,700 rpm. The motor 91 is geared down so that the impeller mechanism 70 operates at 600 rpm. The rotating shaft of the motor 91 carries a toothed pulley 92 aligned with a toothed pulley 93 on the shaft 74 of the impeller mechanism 70. A toothed belt 94 engages the pulleys 92 and 93 so that operation of the motor 91 causes the shaft 74 to rotate. The belt 94 is protected by a guard 95. Power for the motor 91 is derived by wires in a conduit 97 connected to a switch box 98 having a switch 99. Tubing connects the outlet fitting 66 to the site at which the diluted polymer will be utilized. For example, it is contemplated that the drum of concentrated polymer and the mixing and feeding apparatus 10 will be located next to equipment which will deliver the diluted polymer into water to be treated. Cord 100 supplies power to the switch box 98 by way of a plug 101 which is inserted into an electrical receptacle such as a wall outlet. A cord 102 supplies electrical power to the pump 21.

In operation, the mixing and feeding apparatus 10 is placed near a drum of concentrated polymer, which may be highly viscous. Tubing connected to the fitting 23 is inserted into the polymer. A source of water is connected to the inlet 31. When the plug 101 is inserted into the wall outlet, the solenoid valve 33 is automatically opened and water is delivered to the flow meter 35, irrespective of the condition of the switch 99. Accordingly, water immediately flows through the flow meter 35 and into the chamber 50, filling the same and exiting through the outlet bore 65 and the fitting 66 into the water treatment equipment. The output of the pump 21 is pulsating in order to be able to control accurately the rate of delivery of the polymer into the apparatus 10. The water flow is continuous however. Because the quantity of pulsating polymer is small compared to the quantity of continuous water flow, for example, 2% or less, the output of the mixing and feeding apparatus 10 is substantially continuous. That, combined with the mixing action in the mixing chamber and a retention time therein of at least 30 seconds, results in there being no measurable change of the polymer concentration in the continuous output.

When the switch 99 is turned on, the pump 21 becomes energized and it withdraws the concentrated polymer from the drum and moves it through the tubing 25 and the bore 60 into the nozzle 55. The concentrated polymer along with the water exit the nozzle 55 through the slit 58 in a sheet which is vertically oriented. The desired concentration of the resultant product is determined by selecting the flow rates of the polymer and the water. In the case of the polymer, the knobs 28 and 29 are adjusted and in the case of the water, the knob 36 is adjusted. The switch 99 also energizes the motor 91, causing the impeller mechanism 70 to operate. The fins 71 operate much like a paddle wheel to mix or blend the concentrated polymer with the water to provide a diluted polymer which exits the chamber 50 through the outlet bore 65.

Of importance is the time that the water and polymer is retained in the vessel 41. If the retention time is too long, the polymer will have been exposed to whatever shear is created by the impeller mechanism 70 for an excessive period to cause the polymer to lose effectiveness. On the other hand, if the retention time is too short, the polymer would not have an opportunity to be sufficiently uncoiled to become effective. It has been determined that the preferred range of retention time is between 30 seconds and 7 minutes. In an operative embodiment, the volume of the vessel 41 was such as to be capable of holding one gallon of liquid. The rate of flow of the water was adjustable between 10 and 100 gallons per hour. At the 100 gallon per hour rate, the retention time would be 36 seconds (1 gallon×60 min./hr.×60 sec./min. divided by 100 gal./hr.). At the 10 gallon per hour rate, the retention time would be 6 minutes.

In order not to damage the long polymer molecules, the mixing and feeding apparatus 10 provides high torque and low shear in the mixing chamber 50. The high torque is generated by the powerful motor 91. The low shear is attained by utilizing the paddle wheel effect of the impeller mechanism 70. In other words, the total surface area of the four fins 71 is substantial in comparison to the cross-sectional area of the chamber 50 as measured through the chamber's vertical or cylindrical axis. In an operative embodiment, the height of the chamber 50 was 10 inches and its diameter was 5.5 inches, so that its cross-sectional area as measured through its cylindrical axis was 55 square inches. In that same embodiment, each fin 71 had a height of 7.75 inches and a width of 1.25 inch or an area of 9.7 square inches. Four such fins gives a total surface area of 38.8 square inches which is about 70% of the cross-sectional area of the cylindrical chamber 50. The total surface area of the fins should be at least 50% of that cross-sectional area to obtain the desired paddle wheel effect. Furthermore, all surfaces within the chamber 50 are carefully deburred and are as smooth as possible, to avoid damage to the polymers.

A further important aspect of the invention is the configuration of the fluids exiting the nozzle 55 and the close proximity of such fluids to the impeller mechanism 70. As previously explained, the water and polymer exit the nozzle 55 in a vertical sheet having a length equal to the length of the slit 58. As is best seen in FIGS. 6 and 7, the nozzle 55 is very close to the impeller mechanism 70 so that the exiting sheet is immediately struck by the rotating fins 71. The substantial velocity of the exiting sheet in conjunction with the speed of the impeller mechanism 70 causes the material to "flip". Whereas the polymer had been encapsulated in oil droplets, the impeller mechanism 70 effectively breaks open the oil droplets which permits the polymer to escape, and be in condition to become extended. As the fluids are mixed, the polymer becomes more and more wet, the polymer becomes further and further extended. In the operative embodiment discussed above, the distance between vertical edges of coplanar fins 71 is about 3.5 inches and the speed of such vertical edges was 110 inches per second (3.5"×600 rpm/60×π).

FIGS. 8 and 9 depict an alternative embodiment in which four generally horizontal back mixing vanes 110 are provided, preferably being integral with the barrel 42. The vanes 110 are directed inwardly and have a curved vertical component as seen in FIG. 9. These vanes force the liquid materials downwardly so as to increase the time they are in the mixer 40, thereby improving the uniformity of the diluted polymer which exits the outlet bore 65. Preferably, the vanes 110 are located midway between the top and bottom walls 43 and 44.

Figure 11:
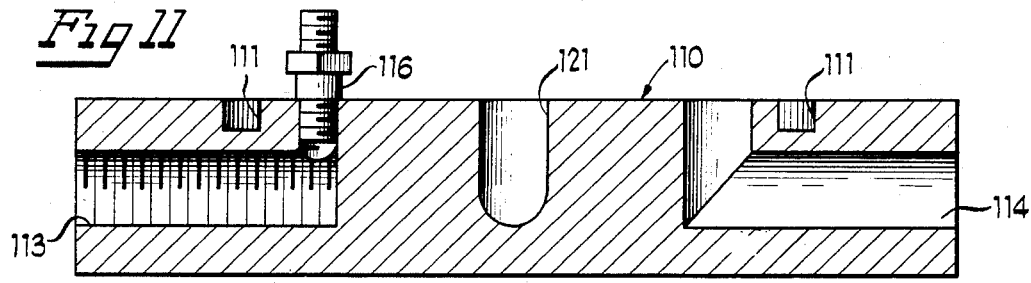
FIG. 11 is a view in vertical section taken along the line 11—11 of FIG. 12.
Figure 12:
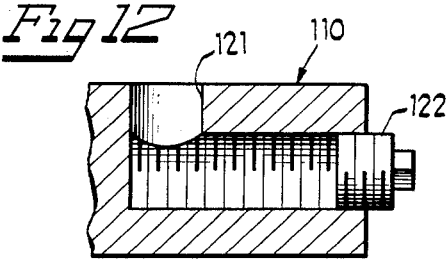
FIG. 12 is a fragmentary view in vertical section taken along the line 12—12 of FIG. 10.

A second embodiment of the invention, in FIGS. 10-12, depicts a different bottom wall 110 which would replace the bottom wall 44 in the first embodiment. The other elements of the apparatus 10 except for the nozzle 55 are employed in the second embodiment also, the fins 71 being shown in phantom. The wall 110 is square, its upper surface having a circular groove 111 therein with a diameter equal to the diameter of the barrel 42 and respectively receiving an O-ring 45 (FIG. 5) therein. The lower end of the barrel 42 is located in the groove 111 in contact with the O-ring 45. The bottom wall 110 has a set of four holes 112 arranged near the corners and being vertically aligned with the four holes 46 in the top wall 43. The four rods 47 are located respectively in the holes 112 and are held in place by means of washers 48 and nuts 49 (FIG. 5), which compresses the O-ring so as to define a liquid-tight chamber. Formed in the wall 110, which preferably is formed of hardened plastic, is a pair of L-shaped bores 113 and 114, the bore 113 being threaded and the bore 114 being unthreaded. The longer legs of the bores 113 and 114 are horizontally oriented in coaxial alignment. The shorter legs of the bores 113 and 114 are vertically oriented and have their axes generally parallel. The bore 113 constitutes an inlet for the polymer and is connected in the manner described with respect to the first embodiment with respect to the inlet bore 60. The bore 114 is connected to the water source in the same manner as the inlet bore 61 in the first embodiment.

Threaded into the shorter leg of the L-shaped bore 113 is a check valve 116. In an operative embodiment, the check valve 116 was supplied by Circle Seal Corp. of Anaheim, Calif. having good resistance to the polymer which flows therethrough. The check valve 116 enables the polymer to be admitted into the chamber 50 (FIG. 6) but precludes reverse flow of the liquid back into the polymer source when the pumps have been turned off. The wall 110 has a hole 120 like the hole 76 in the first embodiment. Also, the wall 110 has a bore 121, the axis of which is perpendicular to the axes of the bores 113 and 114, the bore 121 being closed with a plug 122. The L-shaped bore 121 constitutes a drain opening or a means to admit a third liquid, as in the first embodiment.

Concentrated polymer is moved by the pump 21 (FIG. 2) through the bore 113 and the check valve 116. Thus, the polymer enters the chamber in the form of a vertical spout or jet. Similarly, water is moved through the bore 114 and then through the check valve 116 in the form of a vertical spout or jet. These spouts or jets have their axes generally parallel to the axis of rotation of the impeller mechanism 70 (FIG. 6).

An important aspect of the present invention is that the polymer exiting the valve 116 is immediately adjacent to the impeller mechanism 70 so that the polymer is immediately struck by the rotating fins 71. The distance between the outer ends of the fins 71 and the spout of polymer is as small as possible within the dictates of normal manufacturing tolerances.

What has been described, therefore, is a mixing and feeding apparatus which is capable of mixing concentrated polymer with water to provide a continuous flow of homogeneous, diluted polymer which is not damaged during the mixing operation.

I claim:

1. Mixing and feeding apparatus for receiving polymer and water and for activating and diluting the polymer, comprising a frame, a vessel mounted on said frame and defining a substantially cylindrical chamber therein, said chamber having a cylindrical axis and a given cross sectional area through the cylindrical axis, polymer inlet means for carrying the polymer to said chamber, means mounted on said frame for accurately adjusting the delivery rate of the polymer into said chamber, water inlet means for carrying the water to said chamber, means mounted on said frame for controlling the rate of water flow into said chamber, outlet means for carrying the activated and diluted polymer away from said vessel, an impeller mechanism mounted in said chamber for rotation about the cylindrical axis thereof for mixing the polymer and the water, said impeller mechanism including a plurality of fins having a combined surface area at least one-half the cross sectional area of the chamber, and means for rotating said impeller mechanism.

2. The mixing and feeding apparatus of claim 1, wherein said polymer inlet means and said water inlet means are respectively two separate passageways that separately introduce the polymer and the water into said chamber.

3. The mixing and feeding apparatus of claim 2, and further comprising a check valve communicating with the passageway associated with said polymer inlet means to permit the polymer to flow into said chamber but to prevent either the polymer or the water from flowing out of said chamber through said polymer inlet means.

4. The mixing and feeding apparatus of claim 1, wherein said polymer inlet means and said water inlet means merge into a common passageway before communicating with said chamber, the polymer and the water being jointly introduced into said chamber through said common passageway.

5. The mixing and feeding apparatus of claim 4, and further comprising a nozzle communicating with said common passageway for introducing the polymer and the water into said chamber.

6. The mixing and feeding apparatus of claim 1, wherein the axis of rotation of said impeller is vertical, said polymer inlet means and said water inlet means being constructed and arranged to admit the polymer and the water vertically.

7. The mixing and feeding apparatus of claim 1, wherein said polymer inlet means and said water inlet means are at the bottom of said chamber and said outlet means is at the top thereof.

8. The mixing and feeding apparatus of claim 1, wherein said vessel includes a cylindrical barrel and top and bottom walls and means extending through said top and bottom walls for holding them in tight contact with said barrel disposed therebetween.

9. The mixing and feeding apparatus of claim 8, wherein said barrel is transparent.

10. The mixing and feeding apparatus of claim 8, wherein said polymer inlet means and said water inlet means include passageways in said bottom wall.

11. The mixing and feeding apparatus of claim 10, wherein said passageways are colinear.

12. The mixing and feeding apparatus of claim 10, and further comprising nozzle means attached to said bottom wall and having an outlet port communicating with said passageways.

13. The mixing and feeding apparatus of claim 8, wherein said outlet means includes a passageway in said top wall.

14. The mixing and feeding apparatus of claim 1, wherein said impeller mechanism includes four fins and end caps on the ends thereof.

15. The mixing and feeding apparatus of claim 14, wherein said fins are arranged such that adjacent fins are at right angles.

16. The mixing and feeding apparatus of claim 1, wherein each fin is about 75% of the height of said chamber and 45% of the width thereof.

17. The mixing and feeding apparatus of claim 1, and further comprising nozzle means being a tube having a slit-like exit port, the liquids entering said chamber being oriented in a sheet.

18. The mixing and feeding apparatus of claim 1, wherein the speed of said impeller mechanism is on the order of about 600 rpm.

19. The mixing and feeding apparatus of claim 1, and further comprising pump means for delivering the polymer to said polymer inlet means.

20. The mixing and feeding apparatus of claim 19, wherein said pump means pulsatingly delivers the polymer.

21. The mixing and feeding apparatus of claim 1, and further comprising a plurality of back mixing vanes on said vessel and located in said chamber.

22. The mixing and feeding apparatus of claim 21, wherein said back mixing vanes are located midway between the ends of said cylindrical chamber.

23. The mixing and feeding apparatus of claim 1, wherein said impeller mechanism includes a shaft located along the cylindrical axis of said chamber, each of said fins being rectangular and unapertured, said fins being spaced radially outwardly from said shaft.

24. The mixing and feeding apparatus of claim 1, wherein said means for adjusting the delivery rate of the polymer is capable of setting the rate within the range of 0.02 gallon per hour and one gallon per hour, said means for adjusting the rate of water flow being capable of selecting the rate within the range of zero to one hundred gallons per hour.

25. Mixing and feeding apparatus for receiving polymer and water and for activating and diluting the polymer, comprising a vessel defining a substantially cylindrical chamber therein, said chamber having a cylindrical axis, polymer inlet means for carrying the polymer to said chamber, water inlet means for carrying the water to said chamber, outlet means for carrying the activated and diluted polymer away from said vessel, an impeller mechanism mounted in said chamber for rotation about the cylindrical axis thereof for mixing the polymer and the water, said impeller mechanism including a plurality of fins, said impeller mechanism being located immediately adjacent to said polymer inlet means, means for rotating said impeller mechanism, and nozzle means being a tube having a slit-like exit port, the polymer and the water entering said chamber being oriented in a sheet.

26. The mixing and feeding apparatus of claim 25, wherein said water inlet means communicates directly with said chamber.

27. The mixing and feeding apparatus of claim 25, wherein said water inlet means merges with said polymer inlet means so that the polymer and the water are jointly introduced into said chamber.

28. The mixing and feeding apparatus of claim 27, wherein the direction of elongation of said slit is parallel to the axis of rotation of said impeller means.

29. The mixing and feeding apparatus of claim 25, wherein said polymer inlet means and said water inlet means are at the bottom of said chamber and said outlet means is at the top thereof.

30. The mixing and feeding apparatus of claim 25, wherein said impeller mechanism includes four fins and end caps on the ends thereof.

31. The mixing and feeding apparatus of claim 30, wherein said fins are arranged such that adjacent fins are at right angles.

32. The mixing and feeding apparatus of claim 25, wherein the speed of the edges of said fins is on the order of about 110 inches per second.

33. Mixing and feeding apparatus for receiving polymer and water and for activating and diluting the polymer, comprising a vessel defining a substantially cylindrical chamber therein, said chamber having a cylindrical axis, polymer inlet means for carrying the polymer to said chamber, pump means for pulsatingly delivering the polymer to said polymer inlet means, water inlet means for carrying the water to said chamber, outlet means for carrying the activated and diluted polymer away from said vessel, an impeller mechanism mounted in said chamber for rotation about the cylindrical axis thereof, means for rotating said impeller mechanism, and means for continuously moving water through said water inlet means and into the chamber for mixing therein and thereby causing continuous delivery of the activated and diluted polymer from said outlet means.

34. The mixing and feeding apparatus of claim 33, and further comprising a frame for said vessel, first means mounted on said frame for adjusting the rate of flow of the polymer into said chamber and second means mounted on said frame for adjusting the rate of flow of the water into said chamber, thereby also adjusting the rate of flow of the activated and diluted polymer out of said chamber through said outlet means.

35. The mixing and feeding apparatus of claim 33, wherein said polymer inlet means and said water inlet means are at the bottom of said chamber and said outlet means is at the top thereof.

36. The mixing and feeding apparatus of claim 33, wherein said polymer inlet means and said water inlet means are respectively two separate passageways that separately introduce the polymer and the water into said chamber.

37. The mixing and feeding apparatus of claim 33, wherein said polymer inlet means and said water inlet means merge into a common passageway before communicating with said chamber, the polymer and the water being jointly introduced into said chamber through said common passageway.

38. The mixing and feeding apparatus of claim 33, wherein the axis of rotation is vertical, said polymer inlet means and said water inlet means being constructed and arranged to admit the polymer and the water vertically.

39. The mixing and feeding apparatus of claim 33, and further comprising a check valve communicating with said polymer inlet means to permit the polymer to flow into said chamber but to prevent either the polymer or the water from flowing out of said chamber through said polymer inlet means.

* * * * *

REEXAMINATION CERTIFICATE (1513th)United States Patent [19]

[11] B1 4,522,502

Brazelton

[45] Certificate Issued   Jul. 23, 1991

[54] MIXING AND FEEDING APPARATUS

[75] Inventor: Carl L. Brazelton, Austin, Tex.

[73] Assignee: Stranco

Reexamination Request:
No. 90/002,143, Sep. 20, 1990

Reexamination Certificate for:
Patent No.: 4,522,502
Issued: Jun. 11, 1985
Appl. No.: 539,552
Filed: Oct. 6, 1983

Related U.S. Application Data

[63] Continuation-in-part of Ser. No. 436,023, Oct. 22, 1982, abandoned.

[51] Int. Cl.$^5$ .................... G05D 11/00; B01F 7/20; B01F 15/02

[52] U.S. Cl. .................... 366/160; 366/168; 422/135

[58] Field of Search .............. 366/150, 160, 161, 162, 366/167, 168, 176, 177; 422/135

[56] References Cited

U.S. PATENT DOCUMENTS

| | | | |
|---|---|---|---|
| 3,128,995 | 4/1964 | Shaeffer | 422/135 |
| 3,434,804 | 3/1969 | Winn | 422/135 |
| 4,217,145 | 8/1980 | Gaddis | |

Primary Examiner—Robert W. Jenkins

[57] ABSTRACT

The mixing and feeding apparatus comprises a frame on which is mounted a polymer delivering pump and a water delivering mechanism. The frame also supports a mixer which includes a vessel for receiving the polymer and the water. The impeller mechanism includes four fins at right angles rotatably mounted in the vessel for mixing the water and the concentrated polymer into low shear, high torque conditions.

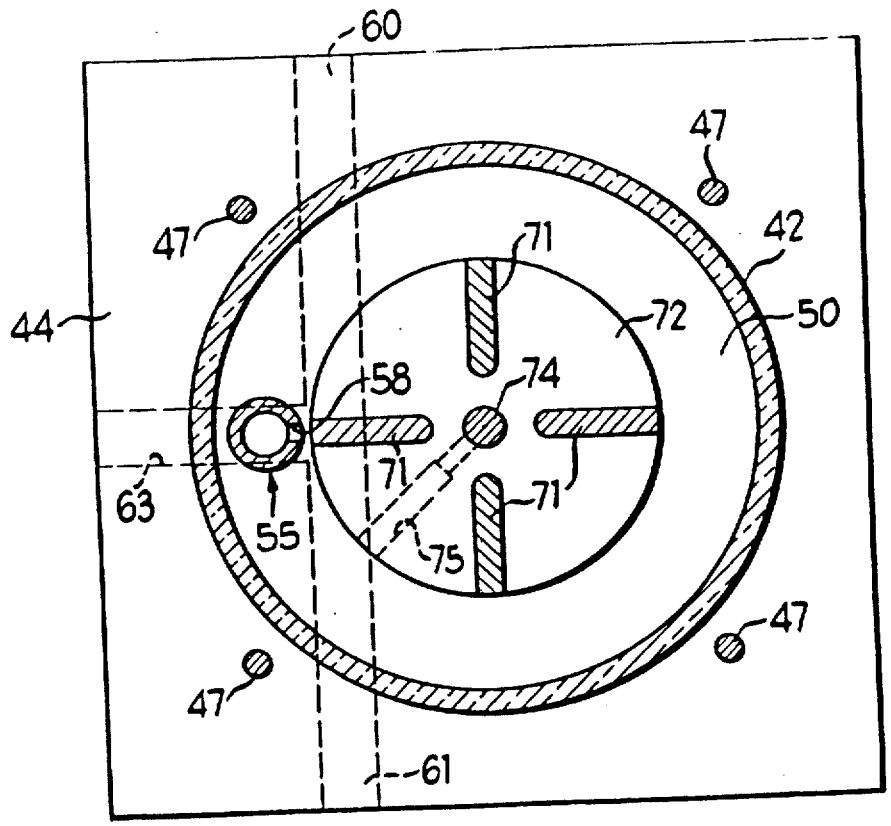

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-39 is confirmed.

* * * * *